United States Patent
Shin et al.

(10) Patent No.: US 10,962,705 B2
(45) Date of Patent: *Mar. 30, 2021

(54) COLOR CONVERSION FILM AND BACK LIGHT UNIT AND DISPLAY APPARATUS COMPRISING THE SAME

(71) Applicant: LG CHEM, LTD., Seoul (KR)

(72) Inventors: Dong Mok Shin, Daejeon (KR); Byeong In Ahn, Daejeon (KR); Nari Kim, Daejeon (KR); Ji Ho Kim, Daejeon (KR); Joo Yeon Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 15/009,447

(22) Filed: Jan. 28, 2016

(65) Prior Publication Data

US 2016/0223728 A1   Aug. 4, 2016

(30) Foreign Application Priority Data

Jan. 31, 2015 (KR) .................. 10-2015-0015705

(51) Int. Cl.
C09K 11/06 (2006.01)
C09K 11/02 (2006.01)
(Continued)

(52) U.S. Cl.
CPC .............. G02B 6/0073 (2013.01); F21K 9/64 (2016.08); G02B 6/005 (2013.01); G02B 6/0055 (2013.01)

(58) Field of Classification Search
CPC ....... C09K 11/06; C09K 11/025; C09K 11/02; C09K 19/38; G02B 6/005; G02B 6/0055; G02B 6/0073
(Continued)

(56) References Cited

U.S. PATENT DOCUMENTS 5,573,909 A    11/1996 Singer et al.
5,904,878 A *   5/1999 Merchak ............. C09B 67/0015
                                                      106/31.64
(Continued)

FOREIGN PATENT DOCUMENTS

JP    2011-241160 A    12/2011
JP    2011241160 A  *  12/2011

OTHER PUBLICATIONS

Machine translation of JP 2011241160 A, printed Sep. 16, 2017, 38 pages.*
(Continued)

*Primary Examiner* — Matthew E. Hoban
*Assistant Examiner* — Lynne Edmondson
(74) *Attorney, Agent, or Firm* — Dentons US LLP (57) ABSTRACT

The invention described in the present specification relates to a color conversion film including a resin matrix; and an organic fluorescent substance, wherein the color conversion film has a light emission peak with FWHM of 70 nm or less when irradiating light having a light emission peak of a 450 nm wavelength, a FWHM of 40 nm or less and monomodal light emission intensity distribution, and a ratio of light emission intensity at 600 nm to light emission intensity at a maximum light emission wavelength is 1:3 or higher, a method for preparing the same, and a back light unit including the color conversion film.

18 Claims, 2 Drawing Sheets

(51) Int. Cl.
*F21V 8/00* (2006.01)
*F21K 9/64* (2016.01)

(58) Field of Classification Search
USPC ............ 252/301.36, 301.16; 428/1.1; 427/64
See application file for complete search history.

(56) References Cited

U.S. PATENT DOCUMENTS

| | | | |
|---|---|---|---|
| 2001/0009691 A1* | 7/2001 | Thompson | H01L 27/3211 427/66 |
| 2014/0288351 A1* | 9/2014 | Jones | A61N 5/06 600/9 |
| 2015/0192273 A1* | 7/2015 | Hikmet | B82Y 30/00 362/84 |
| 2017/0261673 A1* | 9/2017 | Kim | G02B 6/005 |

OTHER PUBLICATIONS

Machine translation of JP 2011241160 A, printed Sep. 16, 2017, 38 pages. (Year: 2011).*

* cited by examiner

COLOR CONVERSION FILM AND BACK LIGHT UNIT AND DISPLAY APPARATUS COMPRISING THE SAME

TECHNICAL FIELD

The present application relates to a color conversion film, and a back light unit and a display apparatus including the same.

The present application claims priority to and the benefits of Korean Patent Application No. 10-2015-0015705, filed with the Korean Intellectual Property Office on Jan. 31, 2015, the entire contents of which are incorporated herein by reference.

BACKGROUND ART

As large screen televisions become more common, televisions are also becoming high-definition, slimmer and highly functional. High performance and high definition OLED TVs still have problems of price competitiveness, and real markets for OLED TVs have not yet begun. Accordingly, efforts to similarly secure advantages of OLEDs with LCDs have been continuously made.

As one of the efforts, many quantum dot-related technologies and prototypes have been recently incorporated. However, cadmium-based quantum dots have safety problems such as restrictions on the use, and therefore, interests in manufacturing back lights using quantum dots without cadmium, which has relatively no safety issues, have been rising.

DISCLOSURE

Technical Problem

The present application provides a color conversion film having excellent color gamut and luminance property, a method for preparing the same, and a back light unit and a display apparatus including the color conversion film.

Technical Solution

One embodiment of the present application provides a color conversion film including a resin matrix; and an organic fluorescent substance dispersed in the resin matrix, wherein the color conversion film has a light emission peak with FWHM (full width at half maximum) of 70 nm or less when irradiating light having a light emission peak of a 450 nm wavelength, a FWHM of 40 nm or less and monomodal light emission intensity distribution, and a ratio of light emission intensity at 600 nm to light emission intensity at a maximum light emission wavelength is 1:3 or higher. Herein, light emission intensity at 600 nm means intensity at 600 nm among light emitted when excited with blue light having a light emission peak of a 450 nm wavelength. As the ratio of the light emission intensity becomes higher, light emission intensity at a maximum light emission wavelength becomes higher. According to one example, a ratio of light emission intensity at 600 nm to light emission intensity at a maximum light emission wavelength may be 1:3 or higher, 1:4 or higher or 1:5 or higher.

Other embodiment of the present application provides a color conversion film, wherein, in the embodiment described above, the organic fluorescent substance includes a first fluorescent substance and a second fluorescent substance, the first fluorescent substance has a maximum light emission wavelength in a 620 nm to 680 nm range when irradiating light having a light emission peak at 450 nm, a FWHM of 40 nm or less and monomodal light emission intensity distribution, and the second fluorescent substance has a maximum light emission wavelength in a 590 nm to 630 nm range when irradiating light having a light emission peak at 450 nm, a FWHM of 40 nm or less and monomodal light emission intensity distribution.

Another embodiment of the present application provides a color conversion film, wherein, in the embodiments described above, the organic fluorescent substance includes a first fluorescent substance and a second fluorescent substance, the color conversion film has a maximum light emission wavelength in a 590 nm to 680 nm range when irradiating light having a light emission peak at 450 nm, a FWHM of 40 nm or less and monomodal light emission intensity distribution, and the first fluorescent substance has a Stokes shift of 50 nm or less.

Another embodiment of the present application provides a color conversion film, wherein, in the embodiments described above, the organic fluorescent substance includes a first fluorescent substance and a second fluorescent substance, the color conversion film has a maximum light emission wavelength in a 590 nm to 680 nm range when irradiating light having a light emission peak at 450 nm, a FWHM of 40 nm or less and monomodal light emission intensity distribution, and the first fluorescent substance and the second fluorescent substance each have a different FWHM at light emission peak in a film state when irradiating light having a light emission peak at 450 nm, a FWHM of 40 nm or less and monomodal light emission intensity distribution.

One embodiment of the present application provides a color conversion film, wherein, in the embodiments described above, the organic fluorescent substance is an organic fluorescent substance absorbing blue or green light and emitting red light, the organic fluorescent substance includes a first fluorescent substance and a second fluorescent substance that are different from each other, the first fluorescent substance receives at least some of excited electrons of the second fluorescent substance, or at least some of absorption wavelengths of the first fluorescent substance are overlapped with at least some of light emission wavelengths of the second fluorescent substance.

According to another embodiment of the present application, in the embodiments described above, the first fluorescent substance and the second fluorescent substance each have a different FWHM at light emission wavelength in a film state when irradiating light including a 450 nm wavelength, or having a light emission peak at 450 nm, a FWHM of 40 nm or less and monomodal light emission intensity distribution.

According to another embodiment of the present application, in the embodiments described above, the FWHM at light emission wavelength of the first fluorescent substance in a film state is narrower than the FWHM at light emission wavelength of the second fluorescent substance in a film state when irradiating light having a light emission peak at 450 nm, a FWHM of 40 nm or less and monomodal light emission intensity distribution.

According to another embodiment of the present application, in the embodiments described above, the FWHM at light emission wavelength of the first fluorescent substance in a film state is 60 nm or less when irradiating light having a light emission peak at 450 nm, a FWHM of 40 nm or less and monomodal light emission intensity distribution.

According to another embodiment of the present application, in the embodiments described above, the light emission wavelength of the second fluorescent substance in a film state includes a maximum absorption wavelength of the first fluorescent substance in a film state when irradiating light having a light emission peak at 450 nm, a FWHM of 40 nm or less and monomodal light emission intensity distribution.

According to another embodiment of the present application, in the embodiments described above, the first fluorescent substance has a maximum light emission wavelength in a 620 nm to 680 nm range when irradiating light having a light emission peak at 450 nm, a FWHM of 40 nm or less and monomodal light emission intensity distribution, and the second fluorescent substance has a maximum light emission wavelength in a 590 nm to 630 nm range when irradiating light having a light emission peak at 450 nm, a FWHM of 40 nm or less and monomodal light emission intensity distribution.

According to another embodiment of the present application, in the embodiments described above, the color conversion film has a maximum light emission wavelength in a 590 nm to 680 nm range when irradiating light having a light emission peak at 450 nm, a FWHM of 40 nm or less and monomodal light emission intensity distribution, and the first fluorescent substance has a Stokes shift of 50 nm or less.

Another embodiment of the present application provides a method for preparing the color conversion film according to the embodiments described above, the method including coating a resin solution in which an organic fluorescent substance including a first fluorescent substance and a second fluorescent substance that are different from each other is dissolved on a substrate; and drying the resin solution coated on the substrate.

Another embodiment of the present application provides a method for preparing the color conversion film according to the embodiments described above, the method including extruding an organic fluorescent substance including a first fluorescent substance and a second fluorescent substance that are different from each other together with a resin.

Another embodiment of the present application provides a back light unit including the color conversion film.

Another embodiment of the present application provides a display apparatus comprising the back light unit.

Advantageous Effects

According to a color conversion film of embodiments described in the present specification, light emission efficiency of a first fluorescent substance can be enhanced by a first fluorescent substance receiving at least some of excited electrons of the second fluorescent substance, or absorbing light the second fluorescent substance emits. Consequently, when the first fluorescent substance is a fluorescent substance capable of increasing color gamut, color gamut enhancement can be maximized with a relatively small amount of the first fluorescent substance while a color gamut decrease caused by the second fluorescent substance hardly occurs. In addition, when the second fluorescent substance has a large FWHM at light emission wavelength and does not have favorable effects on color gamut despite high quantum efficiency, the light emission wavelength of the second fluorescent substance can be shifted to the light emission wavelength of the first fluorescent substance to enhance color gamut.

MODE FOR DISCLOSURE

A color conversion film according to one embodiment of the present application is a color conversion film including a resin matrix; and an organic fluorescent substance dispersed in the resin matrix, and has a light emission peak with FWHM of 70 nm or less when irradiating light having a light emission peak of a 450 nm wavelength, a FWHM of 40 nm or less and monomodal light emission intensity distribution, and a ratio of light emission intensity at 600 nm to light emission intensity at a maximum light emission wavelength is 1:3 or higher. According to the embodiment, the color conversion film has a narrow light emission peak with FWHM of 70 nm or less, and therefore, is capable of enhancing color gamut of a display apparatus including the color conversion film. However, when using one type of an organic fluorescent substance, there is a limit in the light emission intensity (efficiency) or quantum efficiency increase even when increasing the amount of the organic fluorescent substance added since an excimer of the organic fluorescent substance is formed, and there may be a problem of a maximum light emission wavelength being shifted to a long wavelength. The organic fluorescent substance of the color conversion film according to the embodiment may include a first fluorescent substance and a second fluorescent substance. For example, by the organic fluorescent substance including a first fluorescent substance and a second fluorescent substance described in embodiments to be described later, a ratio of light emission intensity at 600 nm to light emission intensity at a maximum light emission wavelength may be 1:3 or higher while still having a narrow FWHM at light emission wavelength of 70 nm or less. Consequently, high light emission intensity may be obtained even when using a relatively small amount of the first fluorescent substance. Herein, light emission intensity may be measured using a PL spectrometer.

A color conversion film according to another embodiment of the present application is a color conversion film including a resin matrix; and an organic fluorescent substance dispersed in the resin matrix, wherein the organic fluorescent substance includes a first fluorescent substance and a second fluorescent substance, the first fluorescent substance has a maximum light emission wavelength in a 620 nm to 680 nm range when irradiating light having a light emission peak at 450 nm, a FWHM of 40 nm or less and monomodal light emission intensity distribution, and the second fluorescent substance has a maximum light emission wavelength in a 590 nm to 630 nm range when irradiating light having a light emission peak at 450 nm, a FWHM of 40 nm or less and monomodal light emission intensity distribution. According to this embodiment, the first fluorescent substance may absorb excited electrons in the second fluorescent substance or light emitting from the second fluorescent substance when irradiating light. In this case, intensity of the light emission peak of the first fluorescent substance may be enhanced.

A color conversion film according to another embodiment of the present application is a color conversion film including a resin matrix; and an organic fluorescent substance dispersed in the resin matrix, wherein the organic fluorescent substance includes a first fluorescent substance and a second fluorescent substance, the color conversion film has a maximum light emission wavelength in a 590 nm to 680 nm range when irradiating light having a light emission peak at 450 nm, a FWHM of 40 nm or less and monomodal light emission intensity distribution, and the first fluorescent substance has a Stokes shift of 50 nm or less. Herein, the Stokes shift means a difference between a maximum absorption wavelength and a maximum light emission wavelength of a fluorescent substance. In order to measure the Stokes shift, the maximum absorption wavelength may be obtained by measuring an absorbed amount for each wavelength using a UV-VIS spectrometer, and the maximum light emission wavelength may be obtained by measuring light emission intensity for each wavelength when irradiating light of a specific wavelength using a Photo Luminescence Spectrometer.

A color conversion film according to another embodiment of the present application is a color conversion film including a resin matrix; and an organic fluorescent substance dispersed in the resin matrix, wherein the organic fluorescent substance includes a first fluorescent substance and a second fluorescent substance, the color conversion film has a maximum light emission wavelength in a 590 nm to 680 nm range when irradiating light having a light emission peak at 450 nm, a FWHM of 40 nm or less and monomodal light emission intensity distribution, and the first fluorescent substance and the second fluorescent substance each have a different FWHM at light emission peak in a film state when irradiating light having a light emission peak at 450 nm, a FWHM of 40 nm or less and monomodal light emission intensity distribution. According to this embodiment, the first fluorescent substance may absorb excited electrons in the second fluorescent substance or light emitting from the second fluorescent substance when irradiating light having a light emission peak at 450 nm, a FWHM of 40 nm or less and monomodal light emission intensity distribution. When using an organic fluorescent substance having a narrow FWHM at light emission wavelength in a film state as the first fluorescent substance, and using an organic fluorescent substance having a relatively wide FWHM at light emission wavelength in a film state as the second fluorescent substance, color gamut may be enhanced by the first fluorescent substance without a color gamut decrease caused by the second fluorescent substance, and light emission intensity (efficiency) may be greatly enhanced as well.

A color conversion film according to another embodiment of the present application includes a resin matrix; and an organic fluorescent substance dispersed in the resin matrix, and absorbing blue or green light and emitting red light, wherein the organic fluorescent substance includes a first fluorescent substance and a second fluorescent substance that are different from each other, and the first fluorescent substance receives at least some of excited electrons of the second fluorescent substance, or at least some of absorption wavelengths of the first fluorescent substance are overlapped with at least some of light emission wavelengths of the second fluorescent substance.

According to one example, the first fluorescent substance may receive at least some of excited electrons of the second fluorescent substance. Specifically, when electrons in an excited state are generated by the second fluorescent substance absorbing blue or green light, the second fluorescent substance delivers at least some of the electrons in an excited state to the first fluorescent substance. In this case, the first fluorescent substance may emit light using the received electrons in an excited state. This is also referred to as a FRET phenomenon.

According to another example, at least some of absorption wavelengths of the first fluorescent substance are overlapped with at least some of light emission wavelengths of the second fluorescent substance. Herein, the first fluorescent substance may absorb light the second fluorescent substance emits. Consequently, the first fluorescent substance absorbs light the second fluorescent substance emits in addition to blue light emitting from a light source, and therefore, light emission efficiency may be enhanced with a relatively small amount of the first fluorescent substance.

According to another embodiment of the present application, in the embodiments described above, the first fluorescent substance and the second fluorescent substance have a different FWHM at light emission wavelength in a film state when irradiating light having a light emission peak at 450 nm, a FWHM of 40 nm or less and monomodal light emission intensity distribution.

According to another embodiment of the present application, in the embodiments described above, the FWHM at light emission wavelength of the first fluorescent substance in a film state is narrower than the FWHM at light emission wavelength of the second fluorescent substance in a film state when irradiating light having a light emission peak at 450 nm, a FWHM of 40 nm or less and monomodal light emission intensity distribution. The first fluorescent substance having a small FWHM at light emission wavelength may provide enhanced color gamut. When the second fluorescent substance has a relatively wide FWHM, light emission of a part that may decrease color gamut is either reduced or disappears, and therefore, a color gamut decrease caused by the second fluorescent substance hardly occurs.

According to another embodiment of the present application, in the embodiments described above, the FWHM at light emission wavelength of the first fluorescent substance in a film state is 60 nm or less when irradiating light having a light emission peak at 450 nm, a FWHM of 40 nm or less and monomodal light emission intensity distribution. It is more favorable that the light emission peak with FWHM of the first fluorescent substance is smaller.

According to another embodiment of the present application, the FWHM at light emission wavelength of the second fluorescent substance in a film state is 70 nm or higher when irradiating light having a light emission peak at 450 nm, a FWHM of 40 nm or less and monomodal light emission intensity distribution. Even when the FWHM is wide as described above, light emission of the second fluorescent substance, in which a light emission peak having high quantum efficiency is present around 600 nm, is capable of being converted to light emission of the first fluorescent substance, and therefore, it is advantageous in enhancing color gamut and luminance. A light emission peak with FWHM of the second fluorescent substance in a film state may be 120 nm or less when irradiating light having a light emission peak at 450 nm, a FWHM of 40 nm or less and monomodal light emission intensity distribution. A maximum light emission wavelength of the second fluorescent substance may be from 580 nm to 620 nm when irradiating light having a light emission peak at 450 nm, a FWHM of 40 nm or less and monomodal light emission intensity distribution.

In the present specification, the FWHM at light emission peak means a width of a light emission peak at a half of the maximum height in a maximum light emission peak of the light emitting from a film when irradiating light having a light emission peak at 450 nm, a FWHM of 40 nm or less and monomodal light emission intensity distribution. In the present specification, the FWHM at light emission peak is measured in a film state. In the case of a color conversion film, a FWHM may be measured by irradiating light on the film. A light emission peak with FWHM of an organic fluorescent substance in a film state means measuring a FWHM by irradiating light on, instead of a solution state, a state prepared to a film form with the organic fluorescent substance alone or by mixing the organic fluorescent substance with other components that do not affect FWHM measurement.

According to another embodiment of the present application, in the embodiments described above, the light emission wavelength of the second fluorescent substance in a film state includes a maximum absorption wavelength of the first fluorescent substance in a film state when irradiated with light having a light emission peak at 450 nm, a FWHM of 40 nm or less and monomodal light emission intensity distribution. In this case, the first fluorescent substance may efficiently absorb emitted light of the second fluorescent substance.

According to another embodiment of the present application, in the embodiments described above, the first fluorescent substance has a maximum light emission wavelength in a 620 nm to 680 nm range when irradiating light having a light emission peak at 450 nm, a FWHM of 40 nm or less and monomodal light emission intensity distribution, and the second fluorescent substance has a maximum light emission wavelength in a 590 nm to 630 nm range when irradiating light having a light emission peak at 450 nm, a FWHM of 40 nm or less and monomodal light emission intensity distribution.

According to another embodiment of the present application, in the embodiments described above, the color conversion film has a maximum light emission wavelength in a 590 nm to 680 nm range when irradiating light having a light emission peak at 450 nm, a FWHM of 40 nm or less and monomodal light emission intensity distribution, and the first fluorescent substance has a Stokes shift of 50 nm or less.

According to another embodiment of the present application, in the embodiments described above, the light emission wavelength of the second fluorescent substance includes a maximum absorption wavelength of the first fluorescent substance. In this case, the first fluorescent substance may efficiently absorb emitted light of the second fluorescent substance.

According to another embodiment of the present application, in the embodiments described above, the second fluorescent substance absorbs light with at least some of wavelengths from 450 nm to 570 nm, and the light emission wavelength includes at least some from 570 nm to 630 nm. The maximum light emission wavelength of the second fluorescent substance may be present in 590 nm to 630 nm.

According to another embodiment of the present application, in the embodiments described above, the second fluorescent substance has quantum efficiency of 80% or higher. The quantum efficiency may be measured using methods known in the art, and for example, quantum efficiency (Qy) is defined by [number of emitted photons]/[number of absorbed photons] when irradiating light, and herein, the "number of absorbed photons" is a value subtracting an amount of photons remaining after being absorbed through a color conversion film (amount of blue photons after absorption) based on an initial amount of photons (initial amount of blue photons) measured using a spectroradiometer (TOPCON Corporation) from a front direction in a blue LED back light (maximum light emission wavelength 450 nm), and the "number of emitted photons" is an amount of photons consumed in a green or red light emission form after the color conversion film is excited from receiving blue photons delivered from the back light.

According to another embodiment of the present application, in the embodiments described above, the first fluorescent substance absorbs light with at least some of wavelengths from 570 nm to 620 nm, and the maximum light emission wavelength is 620 nm or higher.

By using such a first fluorescent substance and a second fluorescent substance described above, light emission of 570 nm to 620 nm may be shifted to light of 620 nm or higher.

According to one embodiment of the present application, content of the first fluorescent substance may be from 0.001% by weight to 1% by weight based on the whole color conversion film.

According to another embodiment of the present application, content of the second fluorescent substance may be from 0.001% by weight to 1% by weight based on the whole color conversion film.

According to another embodiment of the present application, a molar ratio of the first fluorescent substance to the second fluorescent substance is preferably from 1:9 to 10:1. A molar ratio of the first fluorescent substance to the second fluorescent substance is more preferably from 1:3 to 10:1.

As the first fluorescent substance, various fluorescent substances such as cresyl violet perchlorate series as in the following the following Chemical Formula 1, and organic fluorescent substances including a pyrromethene metal complex structure may be used.

[Chemical Formula 1]

As the first fluorescent substance including a pyrromethene metal complex structure, compounds of the following Chemical Formula 2 may be used.

[Chemical Formula 2]

$R_{11}$, $R_{12}$ and L are the same as or different from each other, and each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heteroring group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group or a siloxanyl group, or are linked to adjacent substituents to form a substituted or unsubstituted aromatic or aliphatic hydrocarbon ring or heteroring,

M is a metal having a valency of m, and is boron, berylium, magnesium, chromium, iron, nickel, copper, zinc or platinum,

$Ar_1$ to $Ar_5$ are the same as or different from each other, and each independently hydrogen; an alkyl group; a haloalkyl group; an alkylaryl group; an amine group; an arylalkenyl group unsubstituted or substituted with an alkoxy group; or an aryl group unsubstituted or substituted with a hydroxyl group, an alkyl group or an alkoxy group.

According to one embodiment, L of Chemical Formula 2 is a fluorine group or an alkoxy group.

According to one embodiment, L of Chemical Formula 2 is a fluorine group or an alkoxy group having 1 to 6 carbon atoms.

According to one embodiment, Chemical Formula 2 may be represented by the following structural formulae.

-continued

-continued

-continued

However, the first fluorescent substance is not limited to the above-mentioned structural formulae, and various fluorescent substances may be used.

As the second fluorescent substance, Lumogen Red 305 (BASF Corporation, perylene series), DCM series, Nile red series, Harmima R610, Thiopyronin series and the like may be used, however, the second fluorescent substance is not limited thereto, and various fluorescent substances may be used.

According to one embodiment of the present application, a maximum light emission wavelength of the color conversion film including the first fluorescent substance and the second fluorescent substance is 620 nm or higher.

According to one embodiment of the present application, a FWHM at light emission wavelength of the color conversion film including the first fluorescent substance and the second fluorescent substance in a wavelength range selected from 600 nm to 780 nm is 70 nm or less when irradiating light having a light emission peak at 450 nm, a FWHM of 40 nm or less and monomodal light emission intensity distribution.

According to one embodiment of the present application, the organic fluorescent substance may further include an organic fluorescent substance absorbing blue light and emitting green light, or an organic fluorescent substance emitting light with a wavelength selected from among 520 nm to 555 nm when irradiating light having a light emission peak of a 450 nm wavelength.

In the present specification, blue light, green light and red light may use definitions known in the art, and for example, blue light is light having a wavelength selected from wavelengths of 400 nm to 500 nm, green light is light having a wavelength selected from wavelengths of 500 nm to 560 nm, and red light is light having a wavelength selected from wavelengths of 600 nm to 780 nm. In the present specification, a green fluorescent substance absorbs at least some of blue light and emits green light, and a red fluorescent substance absorbs at least some of blue light or green light and emits red light. For example, a red fluorescent substance may absorb light having a wavelength of 500 nm to 600 nm as well as blue light.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots. For example, a 5 micrometer-thick color conversion film using a red fluorescent substance content in 0.5 wt % is capable of exhibiting high luminance of 1200 nit or higher based on the luminance of 600 nit of a blue back light unit (blue BLU).

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, transparency means having visible light transmittance of 70% or higher. For example, a PET film may be used as the substrate.

The color conversion film described above may be prepared by coating a resin solution in which the organic fluorescent substance described above is dissolved on a substrate and drying the result, or by extruding and filming the organic fluorescent substance described above together with a resin.

The organic fluorescent substance described above is dissolved in the resin solution, and therefore, the organic fluorescent substance is uniformly distributed in the solution. This is different from a quantum dot film preparation process that requires a separate dispersion process.

Additives may be added to the resin solution as necessary, and for example, light diffusing agent such as silica, titania, zirconia and alumina powder may be added.

As for the resin solution in which the organic fluorescent substance is dissolved, the preparation method is not particularly limited as long as the organic fluorescent substance and the resin described above are dissolved in the solution.

According to one example, the resin solution in which the organic fluorescent substance is dissolved may be prepared using a method of preparing a first solution by dissolving an organic fluorescent substance in a solvent, preparing a second solution by dissolving a resin in a solvent, and mixing the first solution and the second solution. When mixing the first solution and the second solution, it is preferable that these are uniformly mixed. However, the method is not limited thereto, and a method of simultaneously adding and dissolving an organic fluorescent substance and a resin, a method of dissolving an organic fluorescent substance in a solvent and subsequently adding and dissolving a resin, a method of dissolving a resin in a solvent and then subsequently adding and dissolving an organic fluorescent substance, and the like, may be used.

The organic fluorescent substance included in the solution is the same as described above.

As the resin included in the solution, the resin matrix material described above, a monomer curable with this resin matrix resin, or a combination thereof, may be used. For example, the monomer curable with the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterward while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP), cyclohexanone, propylene glycol methylethyl acetate (PGMEA), dioxane and the like, and one type or a mixture of two or more types may be used. When the first solution and the second solution are used, solvents included in each of the solutions may be the same as or different from each other. Even when different types of solvents are used in the first solution and the second solution, these solvents preferably has compatibility so as to be mixed with each other.

The process of coating the resin solution in which the organic fluorescent substance is dissolved on a substrate may use a roll-to-roll process. For example, a process of unwinding a substrate from a substrate-wound roll, coating the resin solution in which the organic fluorescent substance is dissolved on one surface of the substrate, drying the result, and then winding the result again on the roll may be used. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove a solvent. For example, a color conversion film including a fluorescent substance having target thickness and concentration may be obtained on a substrate by carrying out the drying in an oven located close to a coater under a condition to sufficiently evaporate a solvent, in a direction of the substrate progressing during the coating process.

When a monomer curable with the resin matrix resin is used as the resin included in the solution, curing, for example, UV curing, may be carried out prior to or at the same time as the drying.

When the organic fluorescent substance is filmed by being extruded with a resin, extrusion methods known in the art may be used, and for example, a color conversion film may be prepared by extruding the organic fluorescent substance with a resin such as a polycarbonate (PC)-based, a poly(meth)acryl-based and a styrene-acrylonitrile (SAN)-based.

Figure 2:
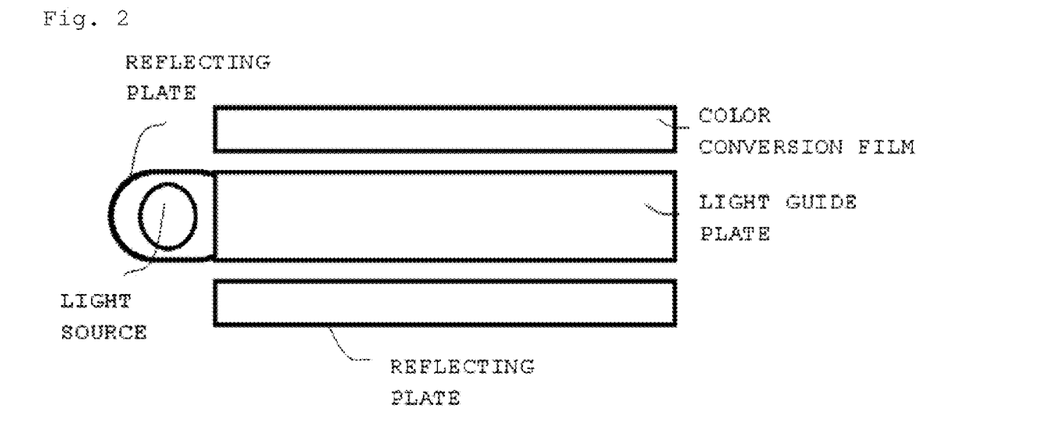
FIG. 2 is a mimetic diagram using a color conversion film according to one embodiment of the present application in a back light.

Another embodiment of the present application provides a back light unit including the color conversion film described above. The back light unit may have back light unit constitutions known in the art except for including the color conversion film. For example, FIG. 2 illustrates one example. According to FIG. 2, the color conversion film according to the embodiments described above is provided on a surface of a light guide plate opposite to a surface facing a reflecting plate. FIG. 2 illustrates a constitution including a light source and a reflecting plate surrounding the light source, however, the structure is not limited thereto, and may be modified depending on back light unit structures known in the art. In addition, the light source may use a direct type as well as a side chain type, and a reflecting plate or a reflecting layer may not be included or replaced with other constituents as necessary, and when necessary, additional films such as a light diffusion film, a light concentrating film and a brightness enhancing film may be further provided. For example, the back light unit may has a layered structure of a light guide plate/the color conversion film/two prism films/a brightness enhancing film (DBEF).

In the constitution of a back light unit such as in FIG. 2, a scattering pattern may be provided as necessary on an upper or lower surface of the light guide plate. Light flowed into the light guide plate has non-uniform light distribution caused by the repetition of optical processes such as reflection, total reflection, refraction and penetration, and the scattering pattern may be used for inducing the non-uniform light distribution to uniform brightness.

Figure 3:
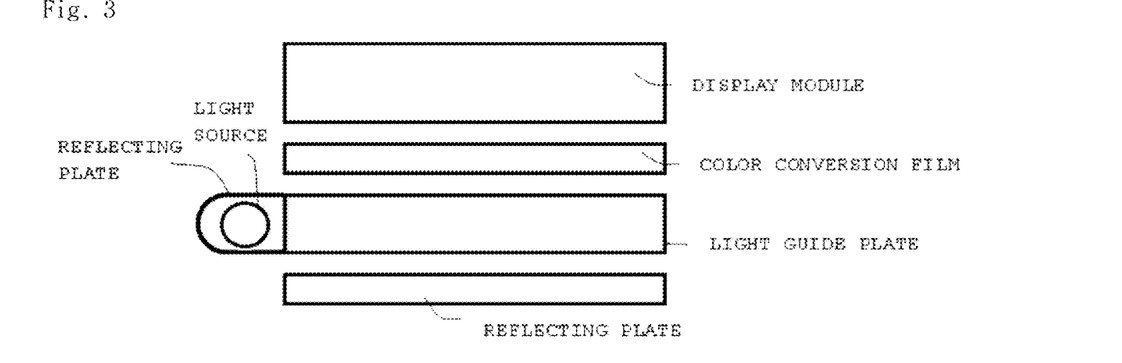
FIG. 3 is a mimetic diagram illustrating a structure of a display apparatus according to one embodiment of the present application.

According to another embodiment of the present application, a display apparatus including the back light unit described above is provided. The display apparatus is not particularly limited as long as it includes the back light unit described above as a constituent. For example, the display apparatus includes a display module and a back light unit. FIG. 3 illustrates a structure of the display apparatus. However, the structure is not limited thereto, and additional films such as a light diffusion film, a light concentrating film and a brightness enhancing film may be further provided as necessary between the display module and the back light unit.

Hereinafter, the present invention will be described in more detail with reference to examples.

Example 1

A first solution was prepared by dissolving CVP, a first fluorescent substance having the following structural formula, and lumogen Red 305, a second fluorescent substance, in a DMF solvent in a molar ratio of 1:2.

(First Fluorescent Substance, CVP)

A second solution was prepared by dissolving PMMA, a thermoplastic resin, in a DMF solvent.

The first solution and the second solution were mixed so that a sum of the content of the first fluorescent substance and the second fluorescent substance became 0.3 parts by weight with respect to 100 parts by weight of the PMMA, and uniformly mixed. Solid content in the mixed solution was 20% by weight, and viscosity was 200 cps. This solution was coated on a PET substrate, and the result was dried to prepare a color conversion film.

A luminance spectrum of the prepared color conversion film was measured using a spectroradiometer (TOPCON Corporation SR series). Specifically, the prepared color conversion film was laminated on one surface of a light guide plate of a back light unit including an LED blue back light (maximum light emission wavelength 450 nm) and the light guide plate, and after laminating a prism sheet and a DBEF film on the color conversion film, a luminance spectrum of the film was measured. When measuring the luminance spectrum, an initial value was set so that the brightness of the blue LED light was 600 nit based on without color conversion film.

Example 2

Preparation was carried out in the same manner as in Example 1 except that the molar ratio of the first fluorescent substance and the second fluorescent substance was 1:1.

Comparative Example 1

Preparation was carried out in the same manner as in Example 1 except that the first fluorescent substance was not used, and only the second fluorescent substance was used.

Comparative Example 2

Preparation was carried out in the same manner as in Example 1 except that the second fluorescent substance was not used, and only the first fluorescent substance was used.

Properties of the light emission wavelength of Examples 1 and 2, and Comparative Examples 1 and 2 are shown in the following Table 1.

TABLE 1

| | Comparative Example 1 | Example 1 | Example 2 | Comparative Example 2 |
|---|---|---|---|---|
| Molar Ratio of First and Second Fluorescent Substances | 0:1 | 1:2 | 1:1 | 1:0 |
| Maximum Light Emission Wavelength (nm) | 620 | 650 | 652 | 655 |
| Light Emission Wavelength FWHM | 80 | 65 | 67 | 67 |
| Light Emission Intensity Ratio[1] | 1:1.3 | 1:4.5 | 1:6.6 | 1:8.7 |

In Examples 1 and 2, the FWHM at light emission wavelength was 70 nm or less. In Comparative Example 1, a film having a wide FWHM was obtained, and in Comparative Example 2, the maximum light emission wavelength was 655 nm, and therefore, light emission intensity was low, thus brightness was undesirably low.

Examples 3 and 4 and Comparative Examples 3 and 4

The color conversion film prepared in Examples 1 and 2, and Comparative Examples 1 and 2, a green light emitting color conversion film including the following HPTS compound, and a blue LED light source were laminated in consecutive order, and color gamut of the light emitting from the laminate after driving a liquid crystal panel was evaluated and shown in the following Table 1. The green light emitting color conversion film included the following HPTS compound in 0.5 parts by weight with respect to 100 parts by weight of a thermoplastic resin PMMA.

(HPTS)

Example 5

Preparation was carried out in the same manner as in Example 4 except that TR-RD170 manufactured by Toray Industries, Inc. was used instead of CVP as the first fluorescent substance.

Example 6

Preparation was carried out in the same manner as in Example 5 except that the molar ratio of the first fluorescent substance and the second fluorescent substance was 5:1.

Figure 1:
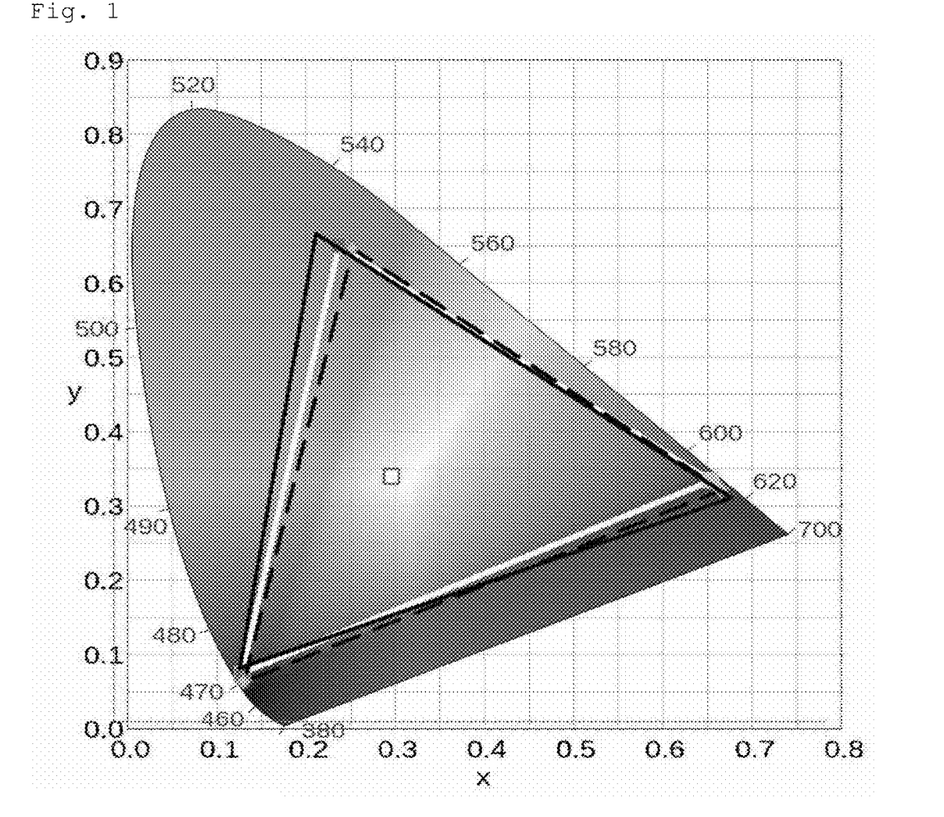
FIG. 1 compares light emission color ranges of color conversion films prepared in Examples 1 and 2, and a color conversion film prepared in Comparative Example 1.

FIG. 1 shows color coordinates of light emitting from the color conversion films of Comparative Example 3 and Examples 4 and 6. According to FIG. 1, it was identified that the triangle using the film of Example 4 or 6 (Example 4: black solid line, Example 6: black dotted line) was wider compared to a white solid triangle using the film of Comparative Example 3, and accordingly, it was identified that more superior color gamut was obtained in the examples. Particularly, it was shown that red area in Examples was wider by applying the first and second fluorescent substances. Blue, green and red color coordinates of Comparative Example 3 and Examples 4 and 6 were as the following Table 2:

TABLE 2

| color coordinate | Comparative Example 3 | | Example 4 | | Example 6 | |
|---|---|---|---|---|---|---|
| | x | y | x | y | x | y |
| Blue | 0.145 | 0.065 | 0.142 | 0.072 | 0.142 | 0.071 |
| Green | 0.253 | 0.638 | 0.228 | 0.654 | 0.242 | 0.641 |
| Red | 0.671 | 0.323 | 0.694 | 0.300 | 0.682 | 0.313 |

Example 7

Preparation was carried out in the same manner as in Example 6 except that the following BD-G1 was used instead of HPTS as the green fluorescent substance.

(BD-G1)

Example 8

Preparation was carried out in the same manner as in Example 6 except that 20 parts by weight of an inorganic fluorescent substance GR-MW540H (beta-SIALON) manufactured by Denka Company Limited was used instead of 0.5 parts by weight of HPTS as the green fluorescent substance, and the molar ratio of the first fluorescent substance and the second fluorescent substance was 5:3.

Comparative Example 3

Preparation was carried out in the same manner as in Example 3 except that the first fluorescent substance was not used.

Comparative Example 4

Preparation was carried out in the same manner as in Example 3 except that the second fluorescent substance was not used.

Comparative Example 5

Preparation was carried out in the same manner as in Example 3 except that TR-RD170 manufactured by Toray Industries, Inc. was used instead of CVP as the first fluorescent substance, and the molar ratio of the first fluorescent substance and the second fluorescent substance was 2:5.

Comparative Example 6

Preparation was carried out in the same manner as in Example 3 except that 20 parts by weight of an inorganic fluorescent substance GR-MW540H (beta-SIALON) manufactured by Denka Company Limited was used instead of 0.5 parts by weight of HPTS as the green fluorescent substance.

Light emission properties obtained when irradiating light having a light emission peak at 450 nm, a FWHM of 40 nm or less and monomodal light emission intensity distribution on the color conversion film obtained in Examples 3 to 8 and Comparative Examples 4 to 6 are shown in the following Table 3.

TABLE 3

| | Green Color Conversion Film | | Red Color Conversion Film | | | | | | sRGB versus Color Gamut (%) | |
|---|---|---|---|---|---|---|---|---|---|---|
| | | | First | Second | | Light Emission | | | | |
| | Fluorescent Substance | FWHM (nm) | Fluorescent Substance | Fluorescent Substance | Mixing Ratio | $\lambda_{max}$ | FWHM (nm) | Intensity Ratio[1] | Luminance (nit) | (x, y) | (u', v') |
| Example 3 | HPTS | 51 | CVP | Lumogen | 1:2 | 650 | 65 | 1:4.5 | 128 | 132 | 129 |
| Example 4 | HPTS | 51 | CVP | Lumogen | 1:1 | 652 | 66 | 1:6.6 | 102 | 135 | 129 |
| Example 5 | HPTS | 51 | TR-RD170 | Lumogen | 1:1 | 637 | 58 | 1:3.3 | 191 | 127 | 121 |
| Example 6 | HPTS | 51 | TR-RD170 | Lumogen | 5:1 | 638 | 50 | 1:4.4 | 178 | 127 | 123 |
| Example 7 | BD-G1 | 45 | TR-RD170 | Lumogen | 5:1 | 638 | 50 | 1:4.4 | 179 | 125 | 129 |
| Example 8 | Inorganic Fluorescent Substance | 52 | TR-RD170 | Lumogen | 5:3 | 636 | 64 | 1:3.7 | 202 | 129 | 130 |
| Comparative Example 3 | HPTS | 51 | X | Lumogen | X | 615 | 81 | 1:1.3 | 199 | 122 | 116 |
| Comparative Example 4 | HPTS | 51 | CVP | X | X | 655 | 67 | 1:8.7 | 44 | 148 | 145 |
| Comparative Example 5 | HPTS | 51 | TR-RD170 | Lumogen | 2:5 | 632 | 75 | 1:1.8 | 199 | 122 | 116 |

TABLE 3-continued

| | Green Color Conversion Film | | Red Color Conversion Film | | | | | | | | |
|---|---|---|---|---|---|---|---|---|---|---|---|
| | | | First | Second | | | | Light Emission | | sRGB versus Color | |
| | Fluorescent | FWHM | Fluorescent | Fluorescent | Mixing | | FWHM | Intensity | Luminance | Gamut (%) | |
| | Substance | (nm) | Substance | Substance | Ratio | $\lambda_{max}$ | (nm) | Ratio[1] | (nit) | (x, y) | (u', v') |
| Comparative Example 6 | Inorganic Fluorescent Substance | 52 | X | Lumogen | X | 615 | 81 | 1:1.1 | 221 | 115 | 114 |

[1]Ratio of light emission intensity at 600 nm to light emission intensity at maximum light emission wavelength The maximum light absorption wavelength, maximum light emission wavelength and Stokes shift of fluorescent substances used in Examples and Comparative Examples are as follows:

1: CVP: absorption=603 nm, emission=635 nm (in DMF) Stokes shift=32 nm, FWHM=67 nm)

2: Lumogen: absorption=575 nm, emission=610 nm (in Toluene) Stokes shift=35 nm FWHM (반치폭)=80 nm)

3: TR-RD170: absorption=588 nm, emission=631 nm (in DMF) Stokes shift=43 nm, FWHM=47 nm In Comparative Examples 3 and 6 that did not use the first fluorescent substance, color gamut was low, and in Comparative Example 4 that did not use the second fluorescent substance, there was a problem of luminance becoming too low.

The invention claimed is:

1. A laminate, comprising:
   a first color conversion film comprising:
      a green fluorescent substance that absorbs at least some of blue light and emits green light; and
      a thermoplastic polymer or thermocurable polymer;
   a second color conversion film laminated onto the first color conversion film and comprising:
      a resin matrix; and
      an organic fluorescent substance,
   wherein the second color conversion film has a light emission peak with FWHM of 70 nm or less and a ratio of light emission intensity at 600 nm to light emission intensity at a maximum light emission wavelength of 1:3 or higher when irradiated with light having a light emission peak at 450 nm wavelength, a FWHM of 40 nm or less, and monomodal light emission intensity distribution,
   wherein the organic fluorescent substance is an organic fluorescent substance absorbing blue or green light and emitting red light, and includes a first fluorescent substance and a second fluorescent substance that are different from each other,
   wherein the first fluorescent substance has a Stokes shift of 50 nm or less, and the Stokes shift means a difference between a maximum absorption wavelength and a maximum light emission wavelength of a fluorescent substance,
   wherein the first fluorescent substance has a maximum light emission wavelength in a 620 nm to 680 nm range when irradiated with light having a light emission peak at 450 nm, a FWHM of 40 nm or less and monomodal light emission intensity distribution, and the second fluorescent substance has a maximum light emission wavelength in a 590 nm to 630 nm range when irradiated with light having a light emission peak at 450 nm, a FWHM of 40 nm or less and monomodal light emission intensity distribution,
   wherein at least some of absorption wavelengths of the first fluorescent substance are overlapped with at least some of light emission wavelengths of the second fluorescent sub stance,
   wherein the light emission wavelength of the second fluorescent substance in a film state includes a maximum absorption wavelength of the first fluorescent substance in a film state when irradiated with light having a light emission peak at 450 nm, a FWHM of 40 nm or less, and monomodal light emission intensity distribution, and
   wherein a molar ratio of the first fluorescent substance to the second fluorescent substance is 1:2 to 5:1.

2. The laminate of claim 1, wherein the second color conversion film has a maximum light emission wavelength in a 590 nm to 680 nm range when irradiated with light having a light emission peak at 450 nm, a FWHM of 40 nm or less and monomodal light emission intensity distribution, and
   wherein the first fluorescent substance and the second fluorescent substance each have a different FWHM at light emission peak in a film state when irradiated with light.

3. The laminate of claim 1, wherein the first fluorescent substance and the second fluorescent substance each have a different FWHM at light emission wavelength in a film state when irradiated with light having a light emission peak at 450 nm, a FWHM of 40 nm or less, and monomodal light emission intensity distribution.

4. The laminate of claim 3, wherein the FWHM at a light emission wavelength of the first fluorescent substance in a film state is narrower than the FWHM at the light emission wavelength of the second fluorescent substance in a film state when irradiated with light having a light emission peak at 450 nm, a FWHM of 40 nm or less, and monomodal light emission intensity distribution.

5. The laminate of claim 4, wherein the FWHM at the light emission wavelength of the first fluorescent substance in a film state is 60 nm or less when irradiated with light having a light emission peak at 450 nm, a FWHM of 40 nm or less, and monomodal light emission intensity distribution.

6. The laminate of claim 1, wherein the FWHM at the light emission wavelength of the second fluorescent substance in a film state is 70 nm or higher.

7. The laminate of claim 1, wherein the color conversion film has a maximum light emission wavelength in a 590 nm to 680 nm range when irradiated with light having a light emission peak at 450 nm, a FWHM of 40 nm or less, and monomodal light emission intensity distribution.

8. The laminate of claim 1, wherein the second fluorescent substance absorbs light with at least some of wavelengths from 450 nm to 570 nm, and a light emission wavelength includes at least some from 570 nm to 630 nm.

9. The laminate of claim 1, wherein the first fluorescent substance absorbs light with at least some of wavelengths from 570 nm to 620 nm, and a maximum light emission wavelength is 620 nm or higher.

10. The laminate of claim 1, which has a maximum light emission wavelength of 620 nm or higher.

11. The laminate of claim 1, which has a FWHM at a light emission wavelength of 70 nm or less in a wavelength range selected from 600 nm to 780 nm, when irradiated with light having a light emission peak at 450 nm, a FWHM of 40 nm or less, and monomodal light emission intensity distribution.

12. A method for preparing the laminate of claim 1, the method comprising:
    coating a solution in which the green fluorescent substance and the thermoplastic polymer or thermocurable polymer are dissolved on a first substrate;
    drying the solution coated on the first substrate to yield the first color conversion film;
    coating a resin solution in which the organic fluorescent substance including the first fluorescent substance and the second fluorescent substance that are different from each other are dissolved on a second substrate;
    drying the resin solution coated on the second substrate to yield the second color conversion film; and
    laminating the first color conversion film onto the second color conversion film.

13. A method for preparing the laminate of claim 1, the method comprising:
    extruding the green fluorescent substance and the thermoplastic polymer or thermocurable polymer to form the first color conversion film;
    extruding the organic fluorescent substance including the first fluorescent substance and the second fluorescent substance that are different from each other together with a resin to form the second color conversion film; and
    laminating the first color conversion film onto the second color conversion film.

14. A back light unit including the laminate of claim 1.

15. The laminate of claim 1, wherein the green fluorescent substance is HPTS:

16. The laminate of claim 1, wherein the green fluorescent substance is

17. The laminate of claim 1, wherein the green fluorescent substance is a beta-SiAlON GR-MW540H.

18. The laminate of claim 1, wherein the thermoplastic polymer is polymethyl methacrylate (PMMA).

* * * * *